US005367298A

United States Patent [19]
Axthelm

[11] Patent Number: 5,367,298
[45] Date of Patent: Nov. 22, 1994

[54] DATA INPUT TERMINAL

[76] Inventor: John K. Axthelm, 4780 Roberts Rd., Caledonia, Ohio 43314

[21] Appl. No.: 782,818

[22] Filed: Oct. 25, 1991

[51] Int. Cl.$^5$ .............................................. B41J 5/10
[52] U.S. Cl. ...................................... 341/22; 341/23; 400/486; 400/489
[58] Field of Search ...................... 341/22, 23, 21, 20; 400/87, 88, 479, 480, 485, 486, 489; 364/709.12, 709.14, 709.15; 345/169

[56] References Cited

U.S. PATENT DOCUMENTS

| | | | |
|---|---|---|---|
| 3,833,765 | 9/1974 | Hilborn et al. | 341/34 |
| 3,976,995 | 8/1976 | Sebestyen | 341/23 |
| 4,211,497 | 7/1980 | Montgomery | 400/486 |
| 5,006,001 | 4/1991 | Vulcano | 400/489 |

Primary Examiner—Michael Horabik
Attorney, Agent, or Firm—Robert E. Stebens

[57] ABSTRACT

A manual entry data input terminal is provided having a keyboard including a set of key switches including one-half of a standard keyboard. A selector circuit is interposed between the key switches and an encoder circuit for enabling input of data bits to the encoder circuit in accordance with a first indicia series correlated to the conventional indicia display of the one-half keyboard or a second indicia series correlated to a mirror image indicia display of the opposite one-half of a standard keyboard. A mode selector switch connected with the selector circuit is selectively operable to enable input of data bits alternatively for either the first or the second indicia series to enable operation of the terminal by one hand.

2 Claims, 3 Drawing Sheets

DATA INPUT TERMINAL

FIELD OF THE INVENTION

This invention relates in general to telecommunication systems. It relates more particularly to a manual entry input terminal for entry of data into a data processing system. This invention relates with further particularity to telecommunication systems adapted to a mobile environment such as automotive vehicles where manual entry requires single hand operation while the vehicle is in transit as it is also necessary to concurrently maintain control of the vehicle.

BACKGROUND OF THE INVENTION

Telecommunication systems have had substantial increase in their usefulness and utility in association with automotive vehicles. Many people are engaged in occupations requiring that they travel, often on a frequent basis, such as in the construction trades or in sales and service businesses. These people may spend a substantial part of their working day in transit between their primary business location and remote work locations or construction sites or the business locations of others and desire to make the travel time also productive. This productivity is not limited merely to the individual who is traveling in the vehicle, and such individuals are usually traveling alone; but, it is also intended to effect increased productivity by associates and support personnel, such as those persons located at a fixed home office location, who are also engaged in the work of the individual who is in a mobile work situation.

One such telecommunication system which has provided impetus for this type of communicating is the cellular telephone. The cellular telephone system, particularly where it is installed in generally large geographical areas, enables the individual who is traveling to keep in contact with a home office and to also communicate with persons with which they are doing business or are engaged in performance of other work projects. Such telecommunications, however, have limitations in that they are essentially confined to verbal transmissions. Persons operating a motor vehicle have, of course, a prime responsibility and requirement to operate the vehicle while it is in transit from one location to another. This primary requirement thus limits the capability of the individual to perform other work functions since only one hand is available to perform those other work functions and an individual can only give limited visual attention to those functions.

Almost all business operations where mobile communications are highly desirable and particularly profitable require data transmissions in addition to voice communications. Such data transmissions are of particular importance in those business systems where computers provide a data source as well as storage for information that usually is placed in a visual form such as printed copies that are then relied upon in performance of additional work functions such as sales order forms, technical specifications for engineering projects as well as many other types of visual data formats.

Data input terminals of the type usually associated with data processing systems have a manually operated entry keyboard comprising a number of electrical switches having finger keypads to effect their actuation that are selectively operated to input alphabetical or numerical indicia into the communicating system. These keyboards in their most common form are of a configuration and pattern similar to a typewriter keyboard and require utilization of both hands of the operator to effect the input. This, of course, is impossible in a mobile type environment since, as was pointed out, the user frequently is traveling alone and therefore must continue use of one hand in maintaining control of the vehicle operation. Even though a person may be adept at operating a conventional input keyboard which is of a configuration resembling the keyboard format of conventional typewriters, it is generally impossible for such a person to maintain any degree of speed and proficiency while utilizing only one hand for the entire keyboard. The problem that is encountered is that a person only learns to use that one hand for operation of only the keys which essentially comprise about one half of the keyboard, the right half by the right hand and the left half by the left hand. The difficulty arises in large part because certain fingers are used with particular keys and it is not easy to modify the sequence so that a key which is normally operated by the little finger of one hand will be operated by the index finger of the other hand. The reverse orientation of fingers as between the two hands introduces this difficulty. Additionally, there is substantial difficulty in repositioning of one hand from one side of the keyboard to the other side to place the set of fingers in general alignment with the keys.

The necessity of single hand operation of a data input terminal has been recognized. One attempt to solve this particular problem is disclosed in U.S. Pat. No. 3,833,765 issued Sep. 3, 1974 to E. H. Hilborn, et al. That patent discloses an input terminal having a keyboard having a set of 12 key switches which is very similar to the well-known touch-key type telephone set. In the illustrative embodiment of that patent, these several keys are ascribed several functions such as multiple alphabetic indicia and enables data to be input by single hand operation. While the system enables single hand operation, it also requires that the operator learn a specific operating technique to effect the input of the data. This is a disadvantage in a situation where a person will also be utilizing conventional input terminals as it is difficult to transfer immediately from one operating system to another.

SUMMARY OF THE INVENTION

In accordance with this invention, a manual entry input terminal is provided to enable single hand operation for the input of data into a data processing system. This terminal includes a keyboard having a plurality of selectively operable, manually operated key switches wherein a first set of key switches provide the input for the alphabetical indicia and also for the numerical indicia for the digits 0 through 9. These switches are electrical and have the function of generating electrical signals that are input into the electrical circuit of the system to generate a data signal stream that is representative of the sequence in which the switches are operated. These switches, in an exemplary embodiment, comprise round buttons or keypads that project slightly above the surface of a supporting board and are arranged in a pattern or planar array that is simulative of one half of a conventional computer input terminal or a conventional typewriter keyboard. Specifically, the first set of primary key switches are 20 in number with five such keys arranged in each of four rows. In accordance with this invention, each of these 20 key switches perform dual functions in that they are each utilized to input either of two different series of indicia. A second set of key switches include a mode selector switch which is also an electrical key switch, but is intended to be operated by the person's thumb and enables the operator to select which of the two series of indicia for a particular key switch will have an electrical signal for a specific indicia input to the system. The mode selector switch is of a two-position switch that is of a type which will remain in the position to which it is last placed until such time as it is next actuated to its other position.

The first set of key switches as indicated are arranged in a configuration or are arrayed on the keyboard to simulate the respective positions of keys as found on the right half of a conventional input terminal keyboard for computer systems or a typewriter. These 20 keys have the function of inputing the alphabetic or numerical indicia that are associated with the right side of a conventional keyboard that is operated by the several digits of the right hand. Since most automotive vehicles in the United States are configured so that the operator must use the left hand to control the vehicle, it is the individual's right hand that must operate the input terminal. To facilitate the dual operation of inputing the indicia that are associated with the additional 20 keys comprising the left side of a conventional keyboard and normally operated by the left hand, the first set of key switches are also designed to input the same indicia as would be obtained with the left side of a full keyboard. In accordance with this invention, this is accomplished by having the left half keyboard indicia in a mirror image format with each key switch thus operative as a key for the indicia of one key for the right half and one key for the left half keyboard. The keys for the right half keyboard can be considered as forming a first indicia series and the left half as a second indicia series. Thus, the operator, when utilizing the keyboard for inputing the indicia associated with the right half of a keyboard, utilizes the four fingers in a conventional manner and relationship of each of the fingers to the keys normally operated by the respective fingers. When inputting indicia associated with the left half of a conventional keyboard, the operator again uses the same fingers in operating the key switches to input the same data as would be input if the fingers of the left hand were being used on a conventional keyboard. This format minimizes the transition as to whether the indicia to be input is either of the right- or left-hand side of a conventional full size keyboard.

The mode selector key switch is located in physical relationship to the first set of key switches so that it may be conveniently accessed by the operator's thumb while the fingers remain in the operative region of the first set of key switches. In accordance with this invention, the mode selector key switch is of a type which, when placed in either of its two positions, will remain in that position until next actuated. Accordingly, the mode selector key switch will continue the operation of the first set of key switches so that they will input the first or second series of indicia or data associated with either the right or the left side portions of a full keyboard until next actuated. The mode selector switch is also of a physical configuration such that when, in one position, it will project a distance above the surface of the keyboard and thus provide tactile information to the operator as to location of the hand with respect to the primary keys and also as to its operating position. In a second position, the mode selector key switch is essentially recessed into the keyboard and thus the operator can readily ascertain that the unit is in that associated operating mode. Other key switches are advantageously provided for operation by the operator's thumb to perform other functions in an input system of this nature.

The input terminal keyboard is intended to be operated primarily without visual reference. In accordance with this invention, it is advantageously provided with additional tactile reference points to assist the operator in appropriately positioning the hand with respect to the keys. One such tactile reference that is provided comprises an upstanding rib extending along one side of the board and against which the side of the palm will rest or engage and provide the tactile information as to the appropriate positioning of the hand in a base of "home" position relative to the actuator pads of the first set of key switches.

These and other objects and advantages of this invention will be readily apparent from the following detailed description of an illustrative embodiment thereof and the accompanying drawings.

DESCRIPTION OF THE DRAWING FIGURES

DESCRIPTION OF THE ILLUSTRATIVE EMBODIMENT

Figure 1:
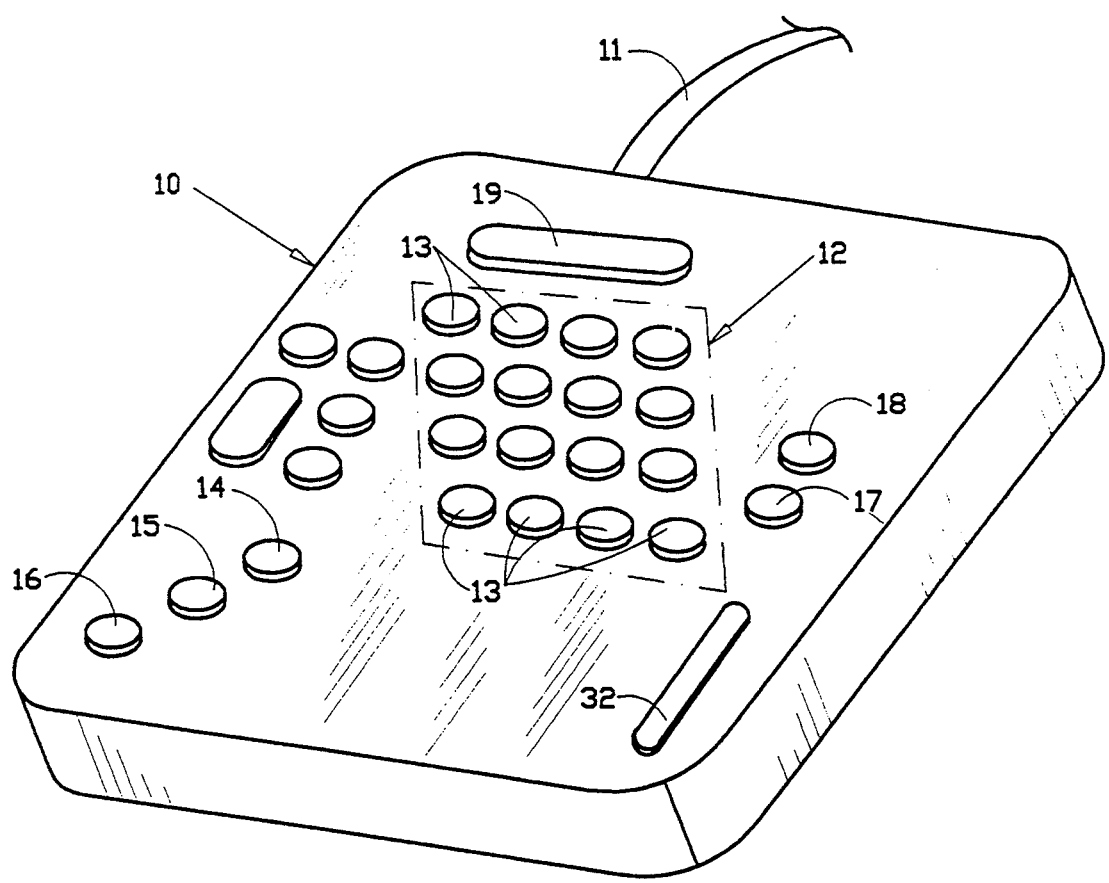
FIG. 1 is a perspective view of an input terminal keyboard of this invention.
Figure 3:
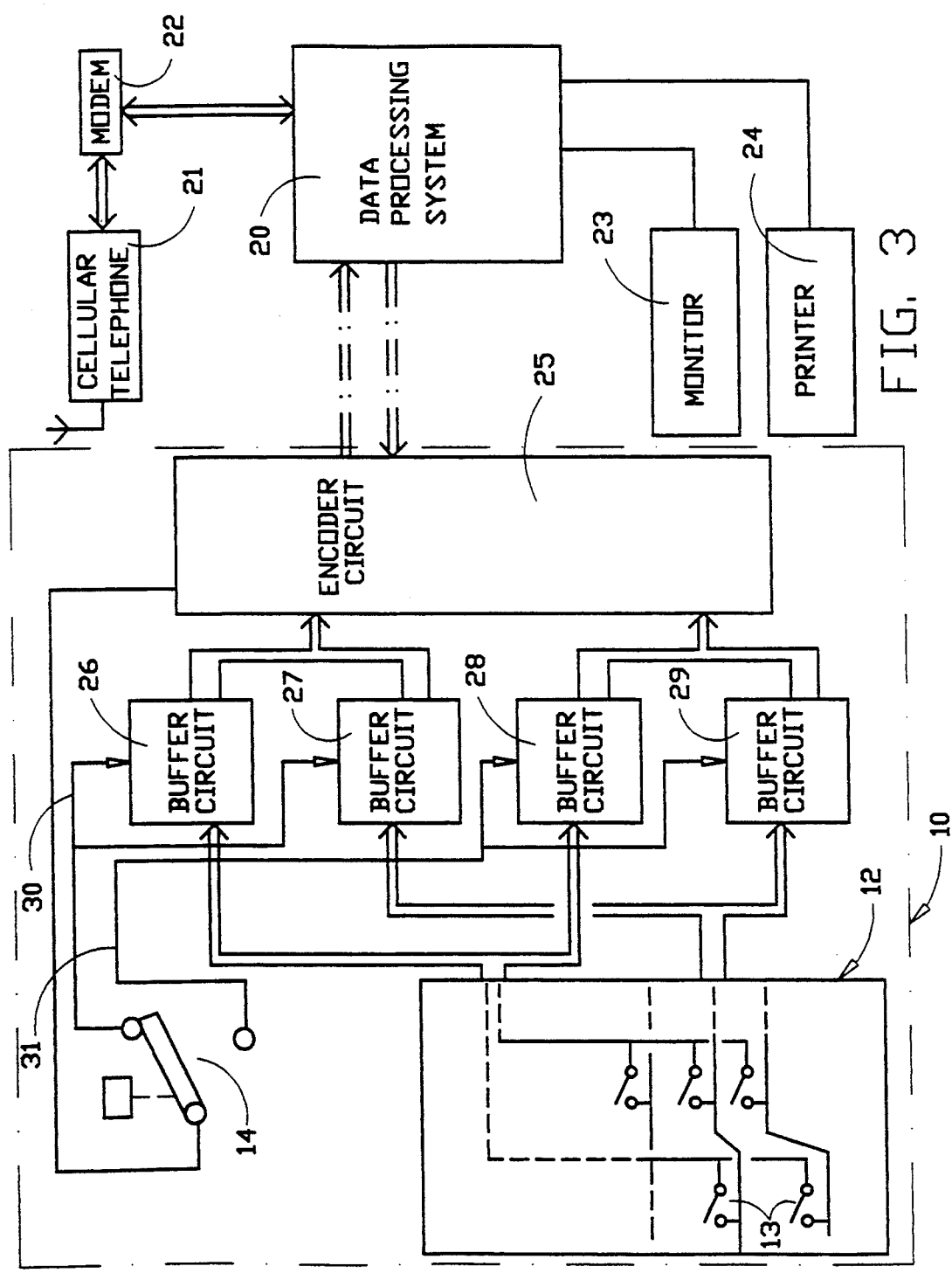
FIG. 3 is a block diagram of an input terminal keyboard embodying the invention and showing the electrical circuit components and interconnection with other components of a data processing system in a typical installation.

Referring to FIG. 1, a keyboard 10 for a data input terminal embodying this invention is shown separately from other components of a typical data processing system that would utilize this invention, although such components are diagrammatically shown in FIG. 3. This keyboard is of a configuration and physical size as to be readily adapted for positioning in an automotive vehicle such as on the seat or other element of the vehicle closely adjacent the vehicle operator. In this embodiment, the keyboard is of a size approximating 8 inches square and one inch deep. This size is sufficient to accommodate the plurality of key switches necessary for implementation of this invention and the electrical circuitry provided in accordance with this invention along with other circuit components normally incorporated into the keyboard. These key switches are illustrated as having an actuator pad of a button-type configuration of cylindrical shape, although for completeness of illustrating the embodiment, there are other switches having an actuator pad of a bar-type configuration for other functions commonly provided in a data input terminal. These key switches as in the case of conventional keyboards for data input terminals are electrical switches that may be of either a normally open or closed contact type depending upon the particular circuit function that each is to perform. The construction and specifics of the key switches are well-known and thus they are not illustrated in extensive detail. It is to be understood that the key switches are interconnected with a logic circuit of a conventional design for electronic keyboards that provide a discrete input for each key to other components of the system. The keyboard 10 is electrically interconnected with other components of the data processing system by a multiconductor, flexible cable 11 enabling the keyboard to be placed at a location preferred by the operator when used or to be placed in an out-of-the-way storage position.

A basic data terminal is designed to input both alphabetic and numerical indicia. Such indicia are generally utilized in combination to provide a composite input signal or command to the sytem. To enable input of such alphanumeric indicia, this invention provides a first set of key switches designated generally by the numeral 12 (located within the broken line) comprising a plurality of key switches having respective actuator pads 13. These key switches are disposed in an array consisting of four rows of five switches each and, as can be seen, are arranged in a pattern that is simulative of the right half of a conventional data terminal board or a conventional typewriter. The keys in the several rows are offset relative to other rows to provide the expected positioning as to one who is accustomed to operating of a conventional type keyboard. The specific indicia associated with each of these key switches is shown in FIG. 2 and will be further explained.

Also provided on the keyboard 10 is a second set of key switches similar in structure and functioning to thus offset the first set and also designed to generate electrical signals. The most significant aspect of the second set for this invention is a mode selector key switch 14 which provides for selection as to the first and second series indicia associated with the right or the left-hand side, respectively, of a conventional full keyboard. This mode selector switch 14 is of a type which includes at least one movable switch contact that can be alternatingly positioned in either of two selected positions through operation of its associated keypad accessible from the top of the keyboard and maintained in such selected position. This selector switch as can be seen in FIG. 1 is located to the left and slightly below the field occupied by the first set of key switches 12. In this physically related position, it is readily accessible by the operator's thumb and enables the operator to maintain the fingers overlying the field of the first set of key switches such as is the commonly described "home" position. The mechanical and functioning characteristics of the mode selector key switch 14 will be described in further detail with reference to its more detailed diagrammatic illustration in FIG. 3.

Figure 2:
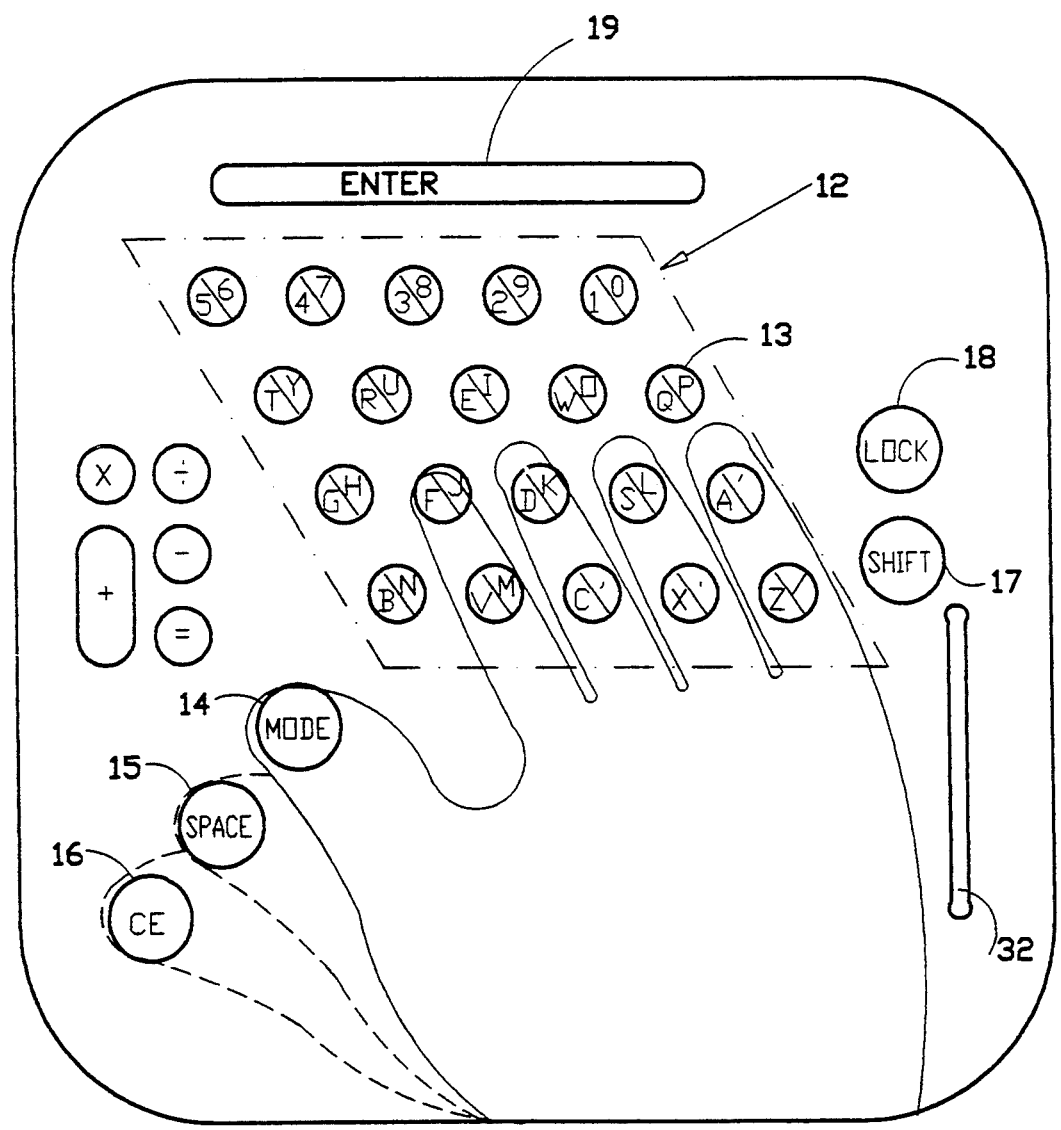
FIG. 2 is a diagrammatic plan view of the keyboard showing arrangement of input data indicia.

Referring next to FIG. 2, this top plan view of the keyboard illustrates the alphabetic and numerical indicia associated with each of the respective key switches 13 of the first set 12. Each of the key switches 13 is designed to input either of two indicia associated with a respective key with that indicia being identical to that of a conventional typewriter keyboard. To illustrate the specific dual indicia that is capable of being input by each key, the representations of the keypads are divided by a diagonal line and the respective indicia is shown. The upper right section of each key shows the indicia that is associated with the 20 keys that comprise the right half of a conventional QWERTY keyboard. The lower left section of each of the illustrated key switches 13 has the respective indicia that is associated with the 20 keys comprising the left side of a conventional keyboard. However, it will be noted that in accordance with this invention, the arrangement of the indicia as to the left keyboard, as associated with the 20 key switches 13 of the first set, is not that which will be seen by reference to a conventional keyboard. In accordance with this invention, the indicia is arranged in a mirror image relationship, that is, the indicia which would normally be associated with the left half of keys. For example, the letter "Z" which is at the extreme left side of a conventional keyboard is associated with the extreme right key on the illustrative keyboard of this invention. The objective of this arrangement is to place the key normally associated with the left side portion of the conventional keyboard in the respective locations such as to be actuated by the same finger on the right hand as they would otherwise be operated by the left hand, i.e., the key for the letter "Z" will be operated by the little finger on the right hand just as it would have been operated by the little finger on the left hand of a conventional keyboard. Similarly, the other keys associated with the left side keyboard are operated by the same finger on the right hand as they would have been if operated with the left hand on a full size conventional keyboard.

FIG. 2 also illustrates other key switches collectively included in what is designated as the second set of key switches in this embodiment of this invention that are generally required in even a basic type keyboard. For example, there are key switches such as a space/backspace key 15, a clear entry key 16 (CE), as well as a shift key 17. Associated with the shift key which functions to obtain the upper and lower case alphabetical indicia as well as other customary keyboard functions is a lock key 18. Each of the space and clear entry keys 15 and 16 are arranged in a generally arcuate type spacing with respect to the mode selector switch key 14. This facilitates their operation by the operator's thumb. The shift key as well as its associated lock are adapted for operation by the operator's right hand little finger. Other keys for performing specific functions may be provided as deemed appropriate for a particular system. These other keys are not specifically identified or described in detail, although there is a key bar 19 which performs the function of entering into the system an accumulation of data that may be input by operation of the several keys. These key switches also are electrical switches interconnected into the system's electrical circuitry and function to input appropriate electrical signals.

Basic circuitry of the input terminal keyboard 10 of this invention is diagrammatically illustrated in FIG. 3 along with its interconnection to a data processing system 20 that is also carried by the vehicle. Since the utility of the keyboard 10 is to input data and transmit that data to a station remote to the vehicle, such as the vehicle operator's home office, the data processing system 20 is coupled with a communicating apparatus which can advantageously be a cellular telephone 21 with a modem 22 for coupling the components. Other components may also be provided in a more comprehensive system that will further enhance a mobile work station. For example, components such as a monitor 23 to provide a visual display and a printer 24 may be coupled with the data processing system 20 and operate either with data generated by operation of the input terminal keyboard 10 or with data received via the cellular telephone 21. It will be understood that use of the monitor 23 will be limited while the vehicle is in motion to minimize the operator/driver's distraction and avoid serious compromise of vehicle safety.

The first set of key switches 12 has its respective switches 13 interconnected in a conventional-type logic circuit similar to that employed in electrical switch keyboards. Since such a logic circuit is well-known in this field, only a portion of this circuit is diagrammatically shown in FIG. 3 with only five of the twenty key switches 13 being illustrated as it will be understood that the other switches will be similarly interconnected. This logic circuit has the design function of providing an identification of each respective key. Actuation of a key switch thus generates an output at two ports that is routed to an encoder circuit 25 through two pairs of buffer circuits 26, 27 and 28, 29. In accordance with this invention, the two pairs of buffer circuits are provided between the output ports of the switch key logic circuit and the encoder circuit 25 to enable the system to function as a full keyboard for input of data, although the apparatus has a first set of key switches that are only one half the number of a full keyboard. Since each of the key switches 13 in the first set 12 performs the functions of two keys on a full size keyboard, the two sets of buffer circuits 26, 27 and 28, 29 are alternatively enabled through operation of the mode selector key switch 14 to take the output from the 20 key switches 13 and create the signal output of a set of 40 such key switches that are on a full keyboard and then input those signals into the encoder circuit 25. The encoder circuit may thus be essentially identical to the encoder circuits utilized with the conventional full keyboard input terminals, thereby minimizing the extent of circuit redesign required to accommodate the half-size input terminal keyboard of this invention. The encoder circuit 15 thus generates a data stream in accordance with the actuation of the input terminal keyboard switches which is then input to the data processing system 20 via the interconnecting cable 11.

It is the function of the mode selector key switch 14 to effect enabled operation of the buffer circuits 26, 27 and 28, 29 in an alternative manner. A typical switch for performance of the mode selection is diagrammatically illustrated in FIG. 3 and in a basic form comprises a movable switch contact connected to a terminal of the encoder circuit for routing of an enabled signal alternatively to respective ones of the pairs of buffer circuits via respective circuits 30, 31. From a mechanical standpoint, the mode selector key switch 14 is of a type wherein its movable contact will remain in either position to which it may be placed until such time as it is next actuated. Thus, the keyboard operator by actuation of the mode selector switch 14 selects which of the pairs of buffer circuits will be enabled at any particular time, thereby determining whether the first set of key switches 12 will be effectively functioning in a right-hand or a left-hand keyboard mode. The buffer circuits 26, 27 or 28, 29 that are enabled at any point will then function to effect input of a signal to the respective inputs of the encoder circuit that are associated with the selected indicia series, either the right or the left side of the keyboard, for a key switch 13 that is actuated.

As previously noted, operation of the keyboard while the vehicle is in motion is most advantageously effected by tactile reference to the keyboard rather than with visual contact. This is important from the standpoint of safety as the operator must be concurrently giving attention to the operation of the vehicle. It is obvious that while the vehicle is moving, the operator cannot have significant visual contact with the keyboard. Accordingly, it is important that the keyboard also be arranged so that the operator can place his hand in the appropriate position for effecting operation of the key switches. Also as previously noted, the keyboard is designed to be placed upon a supporting surface closely adjacent the operator such as on the seat. To facilitate the tactile referencing to the position of the fingers and key switches, auxiliary means may be provided to give such a physical tactile reference. An example of such a reference is incorporated on the keyboard as is shown in FIG. 1. This reference comprises an elongated rib 32 that extends adjacent one side of the board where it may be contacted by the side of the operator's hand. This will give a reference point to the operator for location of the hand at least laterally across the board. The vertical positioning of the hand can generally be readily effected by contact with the key switches 13 of the first set 12.

While the keyboard 10 shown in the drawings and described herein is for a relatively basic input terminal, it will be recognized that the system can be expanded to the degree as may be desired for a particular installation. It will be understood that additional key switches may be provided to expand the input signals that can be generated and thereby increase the capabilities of the system. It must be recognized, however, that expansion of the input terminal for more complete functioning as a computer data system will tend to increase the complexity of operation and the expansion must be limited in accordance with the required degree of safety that must also be maintained.

It will be readily apparent that a novel input terminal is provided for effecting manual entry of data into a data processing system. This input terminal is of a design that is uniquely adapted to single hand operation, but minimizes the differentiation that would ordinarily be experienced as between a single hand input terminal and a full size keyboard entry system. The novel arrangement of a mirror image of left side sets of key switches in combination with the right side reduces the number of key switches to those that are customarily operated by the fingers of one hand. The mirror image arrangement of the indicia minimizes the differentiation between full and half size keyboards such that the operator will experience minimal difficulty in transitioning to operation of the input terminal keyboard of this invention.

Having thus described this invention, what is claimed is:

1. A manual-entry data input terminal for entering of data into a data processing system comprising a keyboard having a first set and a second set of selectively operable, manually actuable electrical key switches which, when actuated, are effective to generate respective electrical signals, each of said electrical key switches having a respective actuator pad mechanically coupled therewith and adapted to be actuated upon contacting engagement thereof by a finger or thumb of an operator's hand, said key switches mounted on said keyboard with the actuator pads thereof accessible to an operator's hand at a top surface of said keyboard, said first set of key switches including a plurality of key switches having their actuator pads disposed in a planar array with their respective operating surfaces engageable by respective fingers of an operator's one hand and positioned in a substantially common plane, the actuator pads of said first set of key switches being relatively oriented to each other in an arrangement of either the right or the left one-half of a QWERTY typewriter keyboard having manually operated actuating keys for each of selected alphabetic characters disposed in each of three spaced parallel, elongated rows, each of said first set of key switches and its respective actuator pad being identifiable with one indicia from each of a first and a second indicia series that are each related to the characters of a respective one-half of the typewriter keyboard, said first indicia series having indicia data bits that correspond to each respective key switch of said first set of key switches in accordance with the characters of either the left or the right one-half of the typewriter keyboard and said second indicia series having indicia bits that correspond to each respective key switch of said first set of key switches in accordance with a mirror image orientation of the characters of the other of the left or the right one-half of the typewriter keyboard, said second set of key switches includes a mode selector key switch for effecting selection of said first or second indicia series for input as data into the data processing system, said mode selector key switch having its actuator pad disposed in offset relationship to said first set of key switch actuator pads at a location to be physically conveniently engaged by the thumb of the operator's one hand when that hand is positioned where the fingers of that hand are used to actuate respective ones of the actuator pads of said first set of key switches, and signal-generating, electrical circuit means responsive to actuation of said key switches for forming a data signal stream in accordance with the indicia of key switches that are actuated and providing the data signal stream at an outlet port for transmission to the data processing system, said circuit means including an encoder circuit connected to said outlet port and operable to form a data signal stream in accordance with data bits applied to inputs thereof and selector circuit means coupled to said first set of key switches and to inputs of said encoder circuit for applying data bits thereto pursuant to actuation of said key switches, said selector circuit means coupled with said mode selector switch for responding to operation of said mode selector switch and to apply data bits corresponding with the indicia of either of the first or the second indicia series of the actuated switches of said first set of key switches in accordance with the indicia series selected by said mode selector switch.

2. A data input terminal according to claim 1 wherein said mode selector switch is selectively positioned in a first position whereby indicia data bits of said first indicia series are enabled to be input and selectively positioned in a second position whereby indicia data bits of said second indicia series are enabled to be input.

* * * * *